(12) United States Patent
Zhang et al.

(10) Patent No.: US 12,230,288 B2
(45) Date of Patent: Feb. 18, 2025

(54) SYSTEMS AND METHODS FOR AUTOMATED CUSTOMIZED VOICE FILTERING

(71) Applicants: SONY INTERACTIVE ENTERTAINMENT LLC, San Mateo, CA (US); SONY INTERACTIVE ENTERTAINMENT INC., Tokyo (JP)

(72) Inventors: Jin Zhang, San Mateo, CA (US); Celeste Bean, San Mateo, CA (US); Sepideh Karimi, San Mateo, CA (US); Sudha Krishnamurthy, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 332 days.

(21) Appl. No.: 17/828,116

(22) Filed: May 31, 2022

(65) Prior Publication Data

US 2023/0410824 A1 Dec. 21, 2023

(51) Int. Cl.
*G10L 19/02* (2013.01)
*G10L 15/187* (2013.01)
(Continued)

(52) U.S. Cl.
CPC .......... *G10L 21/013* (2013.01); *G10L 15/187* (2013.01); *G10L 15/22* (2013.01); *G10L 25/51* (2013.01); *G10L 25/90* (2013.01)

(58) Field of Classification Search
CPC ....... G10L 19/02; G10L 19/00; G10L 19/003; G10L 19/013; G10L 19/0208;
(Continued)

(56) References Cited

U.S. PATENT DOCUMENTS

2007/0033042 A1    2/2007  Marcheret et al.
2008/0111887 A1*   5/2008  Cooper ............ H04N 21/42203
                                                 704/E21.02
(Continued)

FOREIGN PATENT DOCUMENTS

WO    WO 2023/235084    12/2023
WO    WO 2023/235088    12/2023

OTHER PUBLICATIONS

Application No. PCT/US2023/020519, International Search Report and Written Opinion dated Aug. 1, 2023.
(Continued)

*Primary Examiner* — Qi Han
(74) *Attorney, Agent, or Firm* — Kilpatrick Townsend & Stockton LLP

(57) ABSTRACT

Systems and methods for audio processing are described. An audio processing system receives audio content that includes a voice sample. The audio processing system analyzes the voice sample to identify a sound type in the voice sample. The sound type corresponds to pronunciation of at least one specified character in the voice sample. The audio processing system generates a filtered voice sample at least in part by filtering the voice sample to modify the sound type. The audio processing system outputs the filtered voice sample.

20 Claims, 8 Drawing Sheets

(51) Int. Cl.
*G10L 15/22* (2006.01)
*G10L 21/013* (2013.01)
*G10L 25/51* (2013.01)
*G10L 25/90* (2013.01)

(58) Field of Classification Search
CPC ............. G10L 19/0264; G10L 19/0316; G10L 19/0364; G10L 19/038; G10L 19/04; G10L 19/049; G10L 19/12; G10L 19/18; G10L 13/033; G10L 13/0335
USPC ....... 704/278, 203, 202, 206, 232, 236, 243, 704/244, 269, 2
See application file for complete search history.

(56) References Cited

U.S. PATENT DOCUMENTS

| | | | |
|---|---|---|---|
| 2009/0094630 A1* | 4/2009 | Brown | .................. H04H 60/33 725/12 |
| 2011/0066434 A1* | 3/2011 | Li | ........................... G10L 15/10 704/E21.001 |
| 2011/0300806 A1 | 12/2011 | Lindahl et al. | |
| 2014/0314261 A1 | 10/2014 | Selig et al. | |
| 2017/0223471 A1 | 8/2017 | Foo et al. | |
| 2018/0242098 A1 | 8/2018 | Pratt et al. | |
| 2019/0259360 A1 | 8/2019 | Yoelin | |
| 2020/0077190 A1* | 3/2020 | Solis | .................... H04R 1/1041 |
| 2020/0382883 A1* | 12/2020 | Woodruff | ................ G10L 21/10 |
| 2020/0382892 A1 | 12/2020 | Mehta et al. | |
| 2021/0092534 A1 | 3/2021 | Fichtl | |
| 2023/0388705 A1 | 11/2023 | Tinklenberg et al. | |

OTHER PUBLICATIONS

Application No. PCT/US2023/020720, International Search Report and Written Opinion dated Aug. 1, 2023.

U.S. Appl. No. 17/828,668, Non-Final Office Action dated Aug. 1, 2024.

* cited by examiner

*250*

| Object | Events |
|---|---|
| 251 — Activity | activityAvailabilityChange (id[])<br>activityStart (id,location)<br>activityEnd(id,outcome,location) |
| 252 — Zone | locationChange (id,location) |
| 254 — Actor | actorSelect (id[]) |
| 256 — Mechanic | mechanicAvailabilityChange (id[])<br>mechanicInventoryChange (id[])<br>mechanicLoadoutChange (id[])<br>mechanicUse (id[],')<br>mechanicImpact (id') |
| 258 — Game Media | gameMediaUnlock (id)<br>gameMediaStart (id)<br>gameMediaEnd (id) |

FIG. 2B

SYSTEMS AND METHODS FOR AUTOMATED CUSTOMIZED VOICE FILTERING

BACKGROUND

1. Technical Field

The present technology pertains to audio processing. More specifically, the present technology may generated a filtered voice sample from a voice sample by modifying a sound type that is present in the voice sample.

2. Background

Different types of voices, such as voices of persons of different ages, genders, accents, and the like—can exhibit different audio characteristics. Some audio characteristics, such as sibilance, can give certain types of sounds an unpleasant or difficult to understand sound. Such sound types may correspond to pronunciation of certain characters or sequences of characters in certain words, such as "s," "sh," "c," "ch," "f," or "t" sounds in certain words that may exhibit sibilance. In some cases different types of voices may be more prone to undesirable audio characteristics such as sibilance. In some cases, microphones or other audio equipment may not be equally optimized for some types of voices as for other types of voices. Thus, in some cases, microphones or other audio equipment may exacerbate, or fail to account for, such audio characteristics. This can result in different levels of sound quality for different users with different voice types.

SUMMARY

Aspects of the present technology include systems and methods for audio processing. In some examples, an audio processing system receives audio content that includes a voice sample. The audio processing system analyzes the voice sample to identify a sound type in the voice sample. The sound type corresponds to pronunciation of at least one specified character in the voice sample. For instance, the sound type can correspond to sibilance, from pronunciation of certain characters or character sequences, such as "s," "sh," "c," "ch," "f," or "t" sounds in certain words. The audio processing system generates a filtered voice sample at least in part by filtering the voice sample to modify the sound type. The audio processing system can filter the voice sample using a filter that is personalized and/or customized to the voice corresponding to the voice sample, for instance using a trained machine learning model that is trained based on prior voice samples in the same voice. The audio processing system outputs the filtered voice sample, for instance by playing the filtered voice sample using an audio output device and/or by transmitting the filtered voice sample to a recipient device.

In one example, a system for audio processing is provided. The system includes a memory and one or more processors (e.g., implemented in circuitry) coupled to the memory. The one or more processors are configured to and can: receive audio content that includes a voice sample; analyze the voice sample to identify a sound type in the voice sample, wherein the sound type corresponds to pronunciation of at least one specified character in the voice sample; generate a filtered voice sample at least in part by filtering the voice sample to modify the sound type; and output the filtered voice sample.

In another example, a method of audio processing is provided. The method includes: receiving audio content that includes a voice sample; analyzing the voice sample to identify a sound type in the voice sample, wherein the sound type corresponds to pronunciation of at least one specified character in the voice sample; generating a filtered voice sample at least in part by filtering the voice sample to modify the sound type; and outputting the filtered voice sample.

In another example, a non-transitory computer-readable medium is provided that has stored thereon instructions that, when executed by one or more processors, cause the one or more processors to: receive audio content that includes a voice sample; analyze the voice sample to identify a sound type in the voice sample, wherein the sound type corresponds to pronunciation of at least one specified character in the voice sample; generate a filtered voice sample at least in part by filtering the voice sample to modify the sound type; and output the filtered voice sample.

In another example, an apparatus for audio processing is provided. The apparatus includes: means for receiving audio content that includes a voice sample; means for analyzing the voice sample to identify a sound type in the voice sample, wherein the sound type corresponds to pronunciation of at least one specified character in the voice sample; means for generating a filtered voice sample at least in part by filtering the voice sample to modify the sound type; and means for outputting the filtered voice sample.

BRIEF DESCRIPTION OF THE DRAWINGS

Illustrative embodiments of the present application are described in detail below with reference to the following figures:

FIG. 2B is a conceptual diagram illustrating an example table of various objects and associated events, in accordance with some examples;

DETAILED DESCRIPTION

Figure 1:
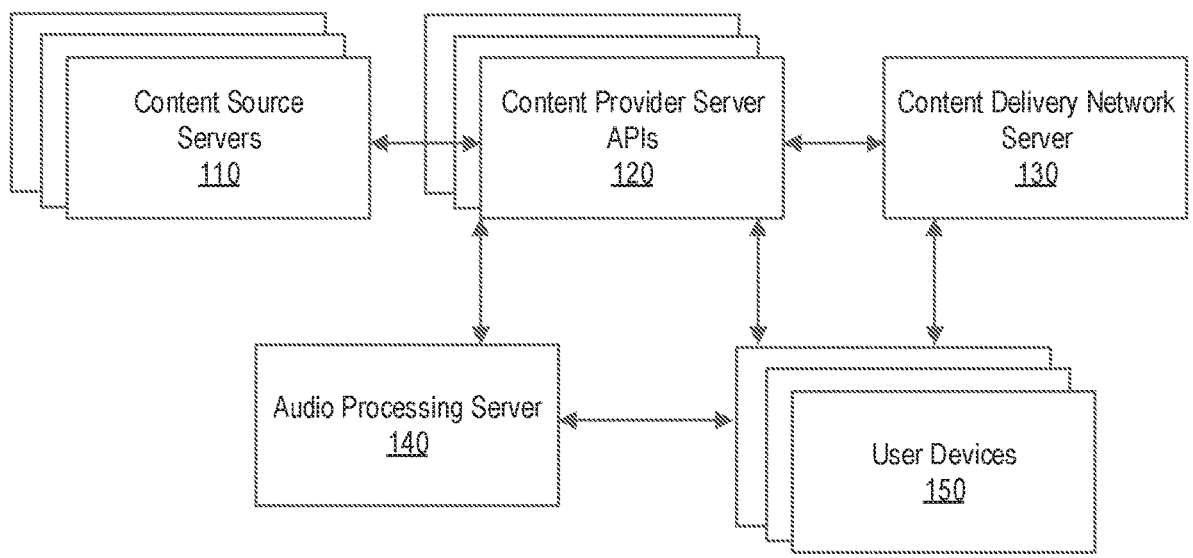
FIG. 1 illustrates a network environment in which a system for audio processing may be implemented, in accordance with some examples.

Different types of voices, such as voices of persons of different ages, genders, accents, dialects, speech dysfluencies, and the like—can exhibit different audio characteristics. Some audio characteristics, such as sibilance, can give certain types of sounds an unpleasant or difficult to understand sound. Such sound types may correspond to pronunciation of certain characters or sequences of characters in certain words, such as "s," "sh," "c," "ch," "f," or "t" sounds in certain words that may exhibit sibilance. In some cases different types of voices may be more prone to undesirable audio characteristics such as sibilance. In some cases, microphones or other audio equipment may not be equally optimized for some types of voices as for other types of voices. Thus, in some cases, microphones or other audio equipment may exacerbate, or fail to account for, such audio characteristics. This can result in different levels of sound quality for different users with different voice types.

In some examples, an audio processing system receives audio content that includes a voice sample. The audio processing system analyzes the voice sample to identify a sound type in the voice sample. The sound type corresponds to pronunciation of at least one specified character in the voice sample. For instance, the sound type can correspond to sibilance, from pronunciation of certain characters or character sequences, such as "s," "sh," "c," "ch," "f," or "t" sounds in certain words. The audio processing system generates a filtered voice sample at least in part by filtering the voice sample to modify the sound type. The audio processing system can filter the voice sample using a filter that is personalized and/or customized to the voice corresponding to the voice sample, for instance using a trained machine learning model that is trained based on prior voice samples in the same voice. The audio processing system outputs the filtered voice sample, for instance by playing the filtered voice sample using an audio output device and/or by transmitting the filtered voice sample to a recipient device.

The audio processing methods and systems described herein provide various technical solutions to various technical problems. For instance, the audio processing methods and systems described herein can improve audio quality for certain voice types, such as those of female users, who may be more prone to audio characteristics such as sibilance using traditional audio systems. The audio processing methods and systems described herein can improve audio quality for certain relative positions of a user to a microphone, as certain relative positions of a user to a microphone can be more prone to audio characteristics such as sibilance using traditional audio systems. The audio processing methods and systems described herein can improve audio quality for individual users by providing personalized and/or customized voice filters on a per-user basis or per-user-category basis, which traditional audio systems are unable to do.

FIG. 1 illustrates an exemplary network environment 100 in which a system for providing a contextual layer for digital content may be implemented. The network environment 100 may include one or more content source servers 110 that provide digital content (e.g., games, other applications and services) for distribution, one or more content provider server application program interfaces (APIs) 120, content delivery network server 130, an audio processing server 140, and one or more user devices 150. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content available for distribution. The content source servers 110 may be associated with any content provider that makes its content available for access over a communication network. Such content may include not only digital video and games, but also other types of digital applications and services. Such applications and services may include any variety of different digital content and functionalities that may be provided to user devices 150.

The content from content source server 110 may be provided through a content provider server API 120, which allows various types of content sources server 110 to communicate with other servers in the network environment 100 (e.g., user devices 150). The content provider server API 120 may be specific to the particular language, operating system, protocols, etc. of the content source server 110 providing the content, as well as the user devices 150. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may use different operating systems, protocols, etc., to process such content. As such, applications and services in different formats may be made available so as to be compatible with a variety of different user device 150.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (i.e. metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

The audio processing server 140 may include a data server that is capable of audio processing. In an exemplary implementation, audio processing server 140 can receive audio content that includes a voice sample. The audio processing server 140 can analyze the voice sample to identify a sound type in the voice sample. The sound type corresponds to pronunciation of at least one specified character in the voice sample. For instance, the sound type can correspond to sibilance, from pronunciation of certain characters or character sequences, such as "s," "sh," "c," "ch," "," or "t" sounds in certain words. The audio processing server 140 can generate a filtered voice sample at least in part by filtering the voice sample to modify the sound type. The audio processing server 140 can filter the voice sample using a filter that is personalized and/or customized to the voice corresponding to the voice sample, for instance using a trained machine learning model that is trained based on prior voice samples in the same voice. The audio processing system outputs the filtered voice sample, for instance by playing the filtered voice sample using an audio output device and/or by transmitting the filtered voice sample to a recipient device.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a client device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 7. Each user device 150 may be associated with participants or other types of spectators of a collection of digital content streams.

Figure 2A:
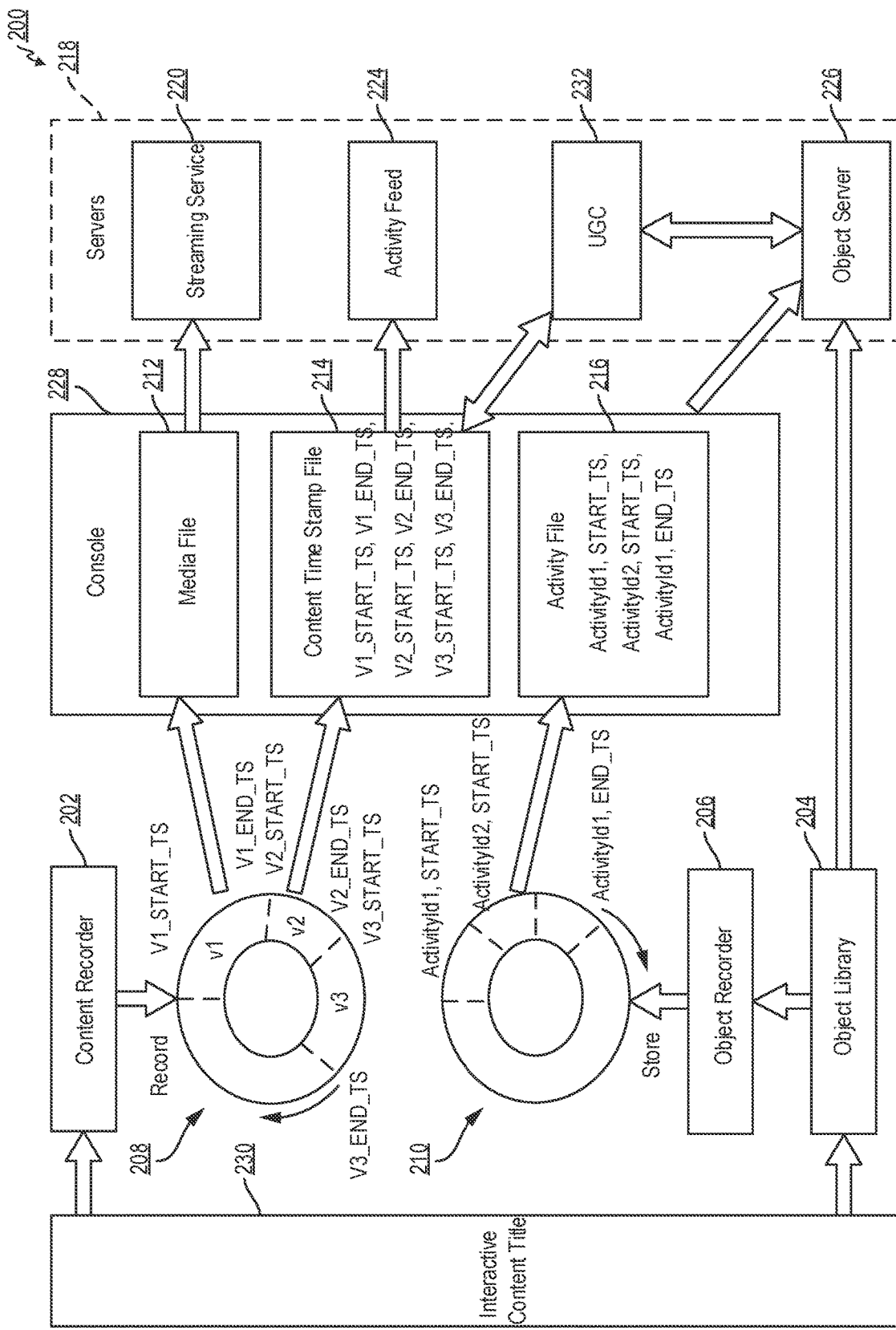
FIG. 2A illustrates an exemplary uniform data system (UDS) that may be used to provide data to a system for audio processing, in accordance with some examples.

FIG. 2A illustrates an exemplary universal or uniform data system (UDS) that may be used to provide data to a system for audio processing. Based on data provided by UDS, an audio processing server 140 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 150) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

FIG. 2B is a conceptual diagram illustrating an example table of various objects and associated events. As shown in the example table 250 of FIG. 2B, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be activity data files 251, zone data files 252, actor data files 254, mechanics data files 256, game media data files 258, and other gameplay-related data files.

Such activity data files 251 (e.g., the object file 216) may be categorized as in in progress, open-ended, or competitive. Such activity data files 251 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 251 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during game-play. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readi-ness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechan-ics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

In some examples, a media file 212, an activity file 216, an activity feed 224, an activity data file 251, a zone data file 252, an actor data file 254, a mechanic data file 256, and/or a game media data file 258 may be examples of an audio clip and/or a voice sample, or may include an audio clip and/or a voice sample. Examples of such an audio clip and/or voice sample include the voice sample 330, the audio content 335, the voice sample 405, the voice sample 505, the audio content of operation 605, the voice sample of operation 605, or a combination thereof.

Figure 3:
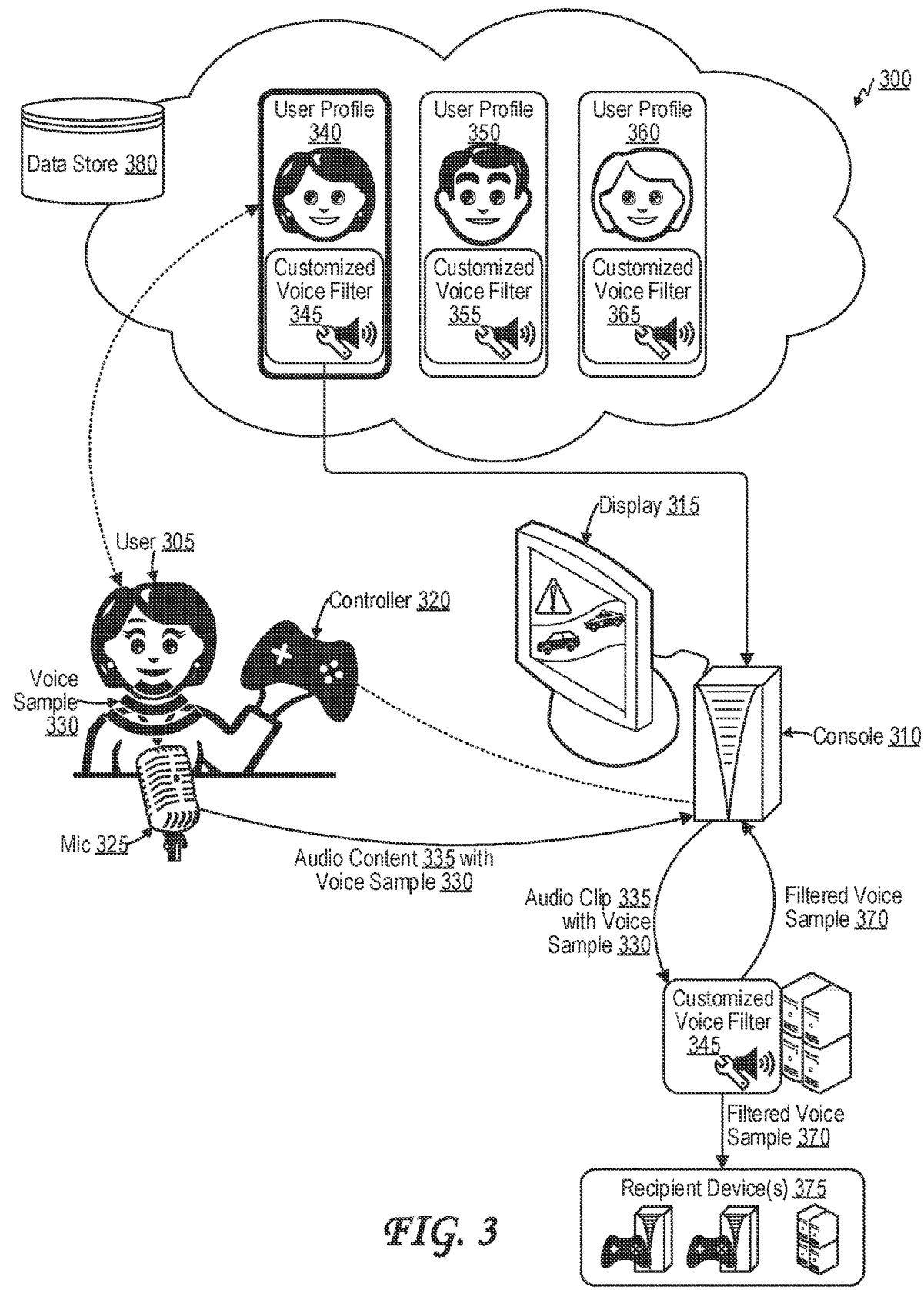
FIG. 3 is a conceptual diagram illustrating an example an audio processing system, in accordance with some examples.

FIG. 3 is a conceptual diagram illustrating an example an audio processing system 300. The audio processing system 300 includes a console 310. The console 310 can be an example of the audio processing server 140, the user devices 150, the console 228, the one or more servers 218, the ML engine 520, the entertainment system 700, or a combination thereof. In some examples, the console 310 may be a video game console. A user 305 is illustrated playing a video game using the console 310. The console 310 is outputting video content to be displayed using the display 315. The video game is illustrated as a racing video game as depicted on the display 315, but can be any type of video game or other interactive content, such as a videoconference, a virtual reality (VR) interface, an augmented reality (AR) interface, a mixed reality (MR) interface, an extended reality (XR) interface, or a combination thereof. The user 305 is illustrated providing inputs to control gameplay of the video game using a controller 320 that transmits signals corresponding to the inputs to the console 310.

The user 305 is also illustrated speaking a voice sample 330 into a microphone 325. The voice sample 330 can include the user 305 saying one or more characters, and in some examples, one or more words. The microphone 325 records an audio content 335 that includes the voice sample 330. In some examples, the voice sample 330 can be used for a voice chat and/or video chat with other users in a network-based multiplayer video game, such as users of one or more recipient devices 375.

The console 310 receives the audio content 335 with the voice sample 330 from the microphone 325. In some examples, the console 310 sends the audio content 335 with the voice sample 330 over a network to an audio processing server 140 that is remote from the console 310. In some examples, the console 310 performs at least some of the operations of the audio processing server 140 itself. The console 310 and/or the audio processing server 140 identify a user profile 340 associated with the user 305 from a set of user profiles in a data store 380. The data store 380 may include one or more data structures (e.g., one or more databases, tables, lists, arrays, matrices, or combinations thereof) stored on the console 310, on the audio processing server 140, separately as part of a network-attached storage system, or a combination thereof. In the example of FIG. 3, the data store 380 is illustrated as storing three different user profiles corresponding to three different users, including the user profile 340 corresponding to the user 305, a second user profile 350 corresponding to a second user, and a third user profile 360 corresponding to a third user.

Each user profile includes a corresponding customized voice filter. For instance, the user profile 340 includes a customized voice filter 345, the user profile 350 includes a customized voice filter 355, and the user profile 360 includes a customized voice filter 365. Each customized voice filter may be customized and/or personalized to a particular voice type. In some examples, the customized voice filter 345 may be customized and/or personalized to the voice of the user 305. For instance, the customized voice filter 345 may include one more trained machine learning (ML) models (e.g., trained ML model(s) 725) that have been trained based on previous voice samples spoken by the user 305 and recorded via one or more microphones (e.g., the microphone 325). In some examples, the customized voice filter 345 may be customized and/or personalized to a voice type that the voice of the user 305 can be categorized into, for instance a voice type corresponding to the gender of the user 305, the sex of the user 305, the age of the user 305, the ethnic background of the user 305, a dialect (e.g., regional dialect) of the user 305, a detected accent of the user 305, a speech dysfluency (e.g., stuttering, stammering, repetition of sounds, sound prolongation, sound blocking, avoidance of sounds, breaks in fluency, hesitations) of the user 305, or a combination thereof. For instance, the customized voice filter 345 may include one more trained machine learning (ML) models (e.g., trained ML model(s) 725) that have been trained based on previous voice samples spoken by the user 305 and/or other users belonging to the same category or categories, and recorded via one or more microphones (e.g., the microphone 325).

The console 310 and/or the audio processing server 140 select the customized voice filter 345 for filtering the audio content 335 and/or the voice sample 330. The console 310 and/or the audio processing server 140 use the customized voice filter 345 to generate a filtered voice sample 370 by filtering the audio content 335 and/or the voice sample 330 using the customized voice filter 345. In some examples, console 310 and/or the audio processing server 140 can output the filtered voice sample 370 back to the console 310 and/or the display 315, for instance to be played by an audio output device (e.g., a speaker or a headphone output) corresponding to the console 310 and/or the display 315. In some examples, console 310 and/or the audio processing server 140 can output the filtered voice sample 370 by transmitting the filtered voice sample 370 to one or more recipient devices 375, such as other consoles of other users that the user 305 is playing a network-based multiplayer game with using the console 310, one or more multiplayer gaming platform servers for managing multiplayer gameplay of the network-based multiplayer game, one or more other computing systems, or a combination thereof.

Figure 4:
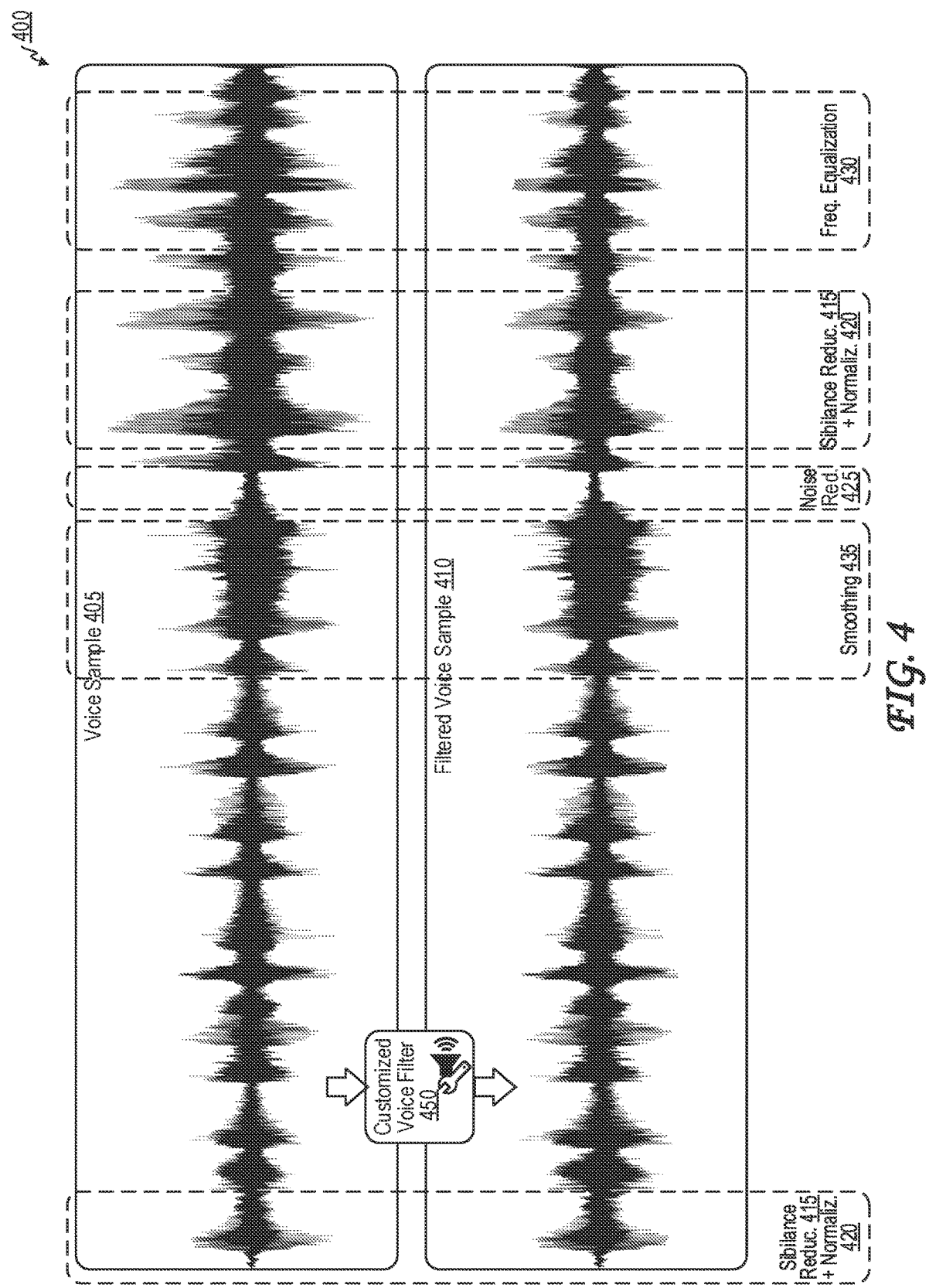
FIG. 4 is a conceptual diagram illustrating an example of use of a customized voice filter to generate a filtered voice sample from a voice sample, in accordance with some examples.

FIG. 4 is a conceptual diagram 400 illustrating an example of use of a customized voice filter 450 to generate a filtered voice sample 410 from a voice sample 405. The voice sample 405 and the filtered voice sample 410 are illustrated as waveforms showing amplitude and/or frequency along a vertical axis, and time along a horizontal axis. Examples of the voice sample 405 include the voice sample 330, the audio content 335, the voice sample 505, the media file 212, the activity file 216, the activity feed 224, the activity data file 251, the zone data file 252, the actor data file 254, the mechanic data file 256, the game media data file 258, or a combination thereof. Examples of the filtered voice sample 410 include the filtered voice sample 370, the filtered voice sample 530, the filtered voice sample 560, the filtered voice sample of operation 615, the media file 212, the activity file 216, the activity feed 224, the activity data file 251, the zone data file 252, the actor data file 254, the mechanic data file 256, the game media data file 258, or a combination thereof. Examples of the customized voice filter 450 include the customized voice filter 345, the customized voice filter 355, the customized voice filter 365, the trained ML model(s) 525, a filter used for the filtering of operation 615, or a combination thereof.

The customized voice filter 450 can be used (e.g., by the console 310 and/or the audio processing server 140) to analyze the voice sample 405 to identify various sound types in the voice sample. The customized voice filter 450 can be used to generate the filtered voice sample 410 at least in part by filtering the voice sample 405 to modify the sound type. In some examples, a sound type identified using the customized voice filter 450 can include sound types corresponding to pronunciation of a specified character (e.g., letter or number or other character) in the voice sample, a specified sequence of characters (e.g., letters and/or numbers and/or or other characters) in the voice sample, a specified word in the voice sample, a specified sequence of words in the voice sample, or a combination thereof. In some examples, a sound type identified using the customized voice filter 450 can include a sound type corresponding to sibilance. For instance, in some examples, a sound type identified using the customized voice filter 450 can include a sound type corresponding to pronunciation of "s," "sh," "c," "ch," "f," or "t" sounds that produce sibilance in pronunciation of certain words. The customized voice filter 450 performs sibilance reduction 415, as is illustrated in two corresponding portions of the filtered voice sample 410 and the voice sample 405 that are highlighted using two respective boxes with dashed outlines. Sibilance reduction 415 can be achieved using a compressor (e.g., a static compressor and/or a dynamic compressor) of the customized voice filter 450 that compresses, attenuates, and/or filters a specified frequency range corresponding to the sound type, to the pronunciation of the specified character(s), and/or to the sibilance.

The customized voice filter 450 can also modify other sound types present in the voice sample 405 to generate the filtered voice sample 410. For example, one sound type can include background noise, which the customized voice filter 450 can compress, attenuate, and/or filter out using noise reduction 425. The customized voice filter 450 can also normalize variations in amplitude (e.g., volume) and/or frequency (e.g., pitch) of the voice sample 405 using normalization 420. The customized voice filter 450 can remove or attenuate outlier sounds using smoothing 435. The customized voice filter 450 can actively modulate, attenuate, and/or modify various frequency bands of the voice sample 405 using frequency equalization 430. Each of these effects are illustrated using respective boxes with dashed outlines highlighting relevant portions of the voice sample 405 that were modified by the customized voice filter 450 using the respective techniques to generate the filtered voice sample 410.

In some examples, the customized voice filter 450 can include one or more passive filters, one or more active filters, or a combination thereof. In some examples, the customized voice filter 450 can include one or more of: a low pass filter, a passive low pass filter, an active low pass filter, a high pass filter, a passive high pass filter, an active high pass filter, a band pass filter, a passive band pass filter, an active band pass filter, a band stop filter, a passive band stop filter, an active band stop filter, a notch filter, a passive notch filter, an active notch filter, an all pass filter, a passive all pass filter, an active all pass filter, an equalization filter, a passive equalization filter, an active equalization filter, or a combination thereof. Some of these filers may be used by the customized voice filter 450 for sibilance reduction 415, normalization 420, noise reduction 425, frequency equalization 430, smoothing 435, compression, other audio processing techniques described herein, or combinations thereof.

In some examples, the customized voice filter 450 can modify (e.g., decrease or increase) a volume and/or amplitude and/or frequency of a portion of the voice sample 405, for instance a portion corresponding to a sound type. Such a modification can be used for sibilance reduction 415, normalization 420, noise reduction 425, frequency equalization 430, smoothing 435, compression, other audio processing techniques described herein, or combinations thereof.

Figure 5:
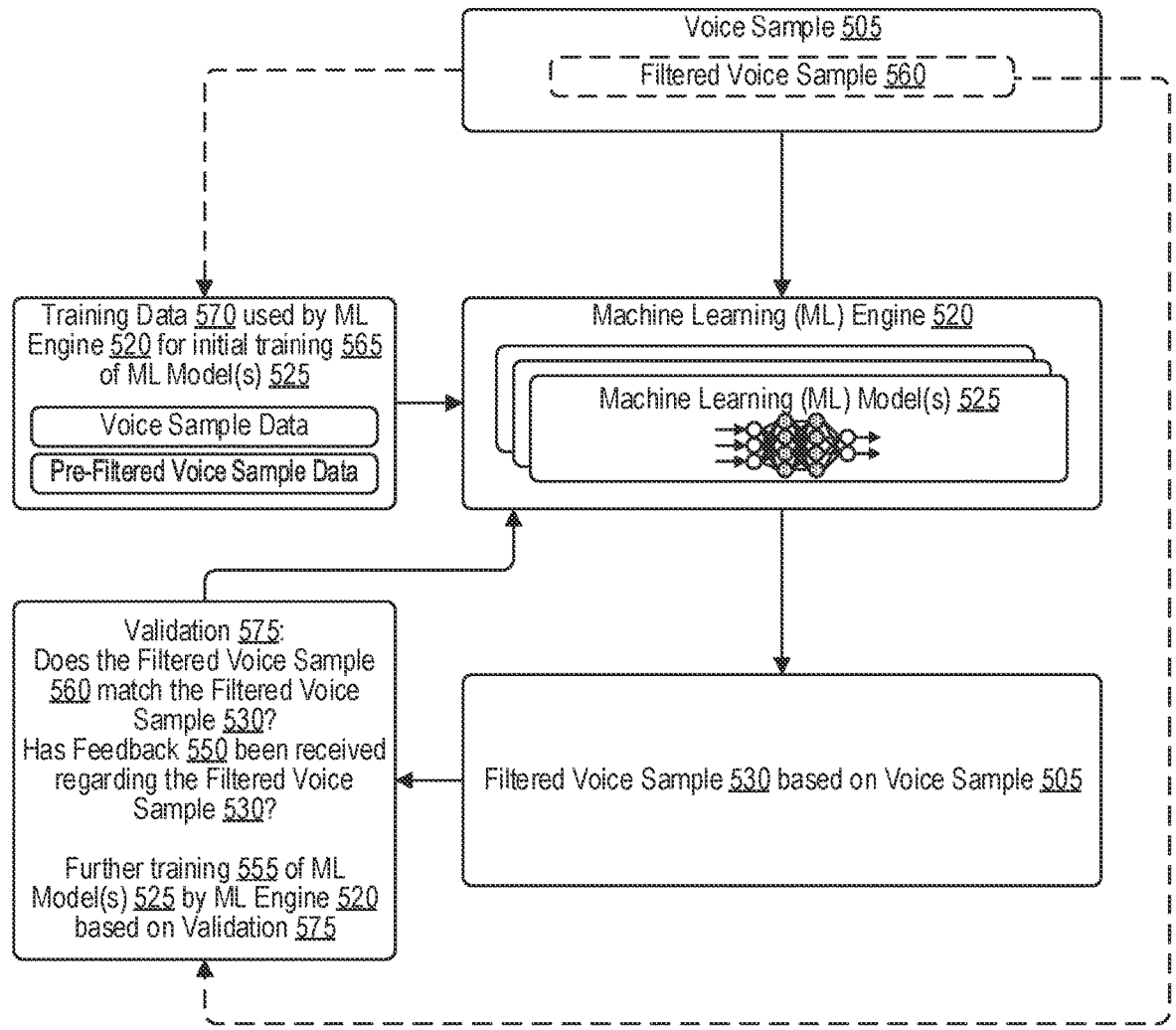
FIG. 5 is a block diagram illustrating use of one or more machine learning models of a machine learning engine to generate a filtered voice sample from a voice sample, in accordance with some examples.

FIG. 5 is a block diagram illustrating use of one or more machine learning models 525 of a machine learning engine 520 to generate a filtered voice sample 530 from a voice sample 505. Examples of the ML engine 520 include the network environment 100, the one or more interactive content servers 110, the one or more content provider server APIs 120, the content delivery network server 130, the audio processing server 140, the user devices 150, the network environment 200, the console 228, the one or more servers 218, the console 310, the data store 380, the audio processing system that performs the audio processing process 600, the entertainment system 700, or a combination thereof. Examples of the ML model(s) 525 include the customized voice filter 345, the customized voice filter 355, the customized voice filter 365, the customized voice filter 345, the customized voice filter 450, the customized voice filter, or a combination thereof.

The ML engine 520 generates, trains, and uses the ML model(s) 525 based on an initial training 565 using training data 570. The ML engine 520 trains the ML model(s) 525 to generate a filtered voice sample 530 on input of a voice sample 505 into the ML model(s) 525. The voice sample 505 may include audio data that includes a voice sample, such as the voice sample 330, the audio content 335, the voice sample 405, the media file 212, the activity file 216, the activity feed 224, the activity data file 251, the zone data file 252, the actor data file 254, the mechanic data file 256, the game media data file 258, or a combination thereof.

The ML model(s) 525, and/or the ML engine 520, can include, for example, one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more transformers, one or more classifiers, one or more computer vision systems, one or more deep learning systems, or combinations thereof. The training of the ML model(s) 525 by the ML engine 520 can include supervised training, unsupervised training, or a combination thereof.

The filtered voice sample 530 output by the ML model(s) 525 is a filtered variant of the voice sample 505. Examples of the filtered voice sample 530 include the filtered voice sample 370, the filtered voice sample 410, the filtered voice sample 560, the filtered voice sample of operation 615, the media file 212, the activity file 216, the activity feed 224, the activity data file 251, the zone data file 252, the actor data file 254, the mechanic data file 256, the game media data file 258, or a combination thereof. To generate the filtered voice sample 530 from the voice sample 505, the ML model(s) 525 may modify at least a subset of the voice sample 505 as discussed with respect to the customized voice filter 345, the customized voice filter 355, the customized voice filter 365, the customized voice filter 450, the sibilance reduction 415, the normalization 420, the noise reduction 425, the frequency equalization 430, the smoothing 435, the compression, other audio processing techniques described herein, or combinations thereof.

Within FIG. 5, a graphic representing the ML model(s) 525 illustrates a set of circles connected to another. Each of the circles can represent a node, a neuron, a perceptron, a layer, a portion thereof, or a combination thereof. The circles are arranged in columns. The leftmost column of white circles represent an input layer that receives an input (e.g., the voice sample 505). The rightmost column of white circles represent an output layer that output an output (e.g., the filtered voice sample 530) based on the input from the input layer (e.g., the voice sample 505). Two columns of shaded circled between the leftmost column of white circles and the rightmost column of white circles each represent hidden layers. Some of the hidden layers can correspond to individual modifications to the voice sample 505 on the way to generating the filtered voice sample 530, such as the sibilance reduction 415, the normalization 420, the noise reduction 425, the frequency equalization 430, the smoothing 435, the compression, other audio processing techniques described herein, or combinations thereof.

The training data 570 that the ML engine 520 uses to train the ML model(s) 525 includes voice sample data (e.g., akin to the voice sample 505) as well as pre-filtered voice sample data corresponding to the voice sample data (e.g., akin to the filtered voice sample 530 corresponding to the voice sample 505, and/or to the filtered voice sample 560 corresponding to the voice sample 505). Over the course of the initial training 565, the ML model(s) 525 develop hidden layers between input layers and output layers, and/or weights and/or connections between nodes of the various layers, that each relate to various aspects of the filtered voice sample 530, such as any of the aspects described herein (e.g., related to various sounds and sound types, and modification(s) thereto).

In some examples, the ML engine 520 can continue to train and/or update the ML model(s) 525 over time, for instance based on validation 575 using the filtered voice sample 530 and the voice sample 505. In some examples, a filtered voice sample 560 of the voice sample 505 (separate from the filtered voice sample 530 generated by the ML model(s) 525) may be provided to the ML engine 520 to perform the validation 575 using. In some examples, the filtered voice sample 560 may be generated by a different entity than the ML model(s) 525, for instance a different set of ML model(s) (not pictured) and/or manually by one or more human operators of audio processing software and/or hardware. If, during validation 575, the ML engine 520 determines that the filtered voice sample 530 generated by the ML model(s) 525 matches the filtered voice sample 560, the ML engine 520 can treat this as positive feedback, and can perform further training 555 of the ML model(s) 525 based on the filtered voice sample 530, the voice sample 505, and/or the filtered voice sample 560, for instance to strengthen and/or reinforce weights associated with generating the filtered voice sample 530 in the ML model(s) 525, and/or to weaken or remove other weights other than those associated with generating the filtered voice sample 530, in the ML model(s) 525. If, during validation 575, the ML engine 520 determines that the filtered voice sample 530 generated by the ML model(s) 525 differs from the filtered voice sample 560, the ML engine 520 can treat this as negative feedback, and can perform further training 555 of the ML model(s) 525 based on the filtered voice sample 530, the voice sample 505, and/or the filtered voice sample 560, for instance to weaken and/or remove weights associated with generating the filtered voice sample 530 in the ML model(s) 525, and/or to strengthen and/or reinforce other weights other than those associated with generating the filtered voice sample 530 in the ML model(s) 525.

In some examples, the ML engine 520 receives feedback 550 about the filtered voice sample 530. The feedback can include a reaction by a user of a user device (e.g., audio processing server 140, user devices 150, console 228, servers 218, console 310, recipient device(s) 375, and/or electronic entertainment system 700) via a user interface, a reaction by a user determined based on sensor data from a user device, and/or decisions by a user and/or user device as whether or not to use the filtered voice sample 530 for a further application. Positive feedback can be used to strengthen and/or reinforce weights associated with generating the filtered voice sample 530 in the ML model(s) 525, and/or to weaken or remove other weights other than those associated with generating the filtered voice sample 530 in the ML model(s) 525. Negative feedback can be used to weaken and/or remove weights associated with generating the filtered voice sample 530 in the ML model(s) 525, and/or to strengthen and/or reinforce other weights other than those associated with generating the filtered voice sample 530 in the ML model(s) 525.

Figure 6:
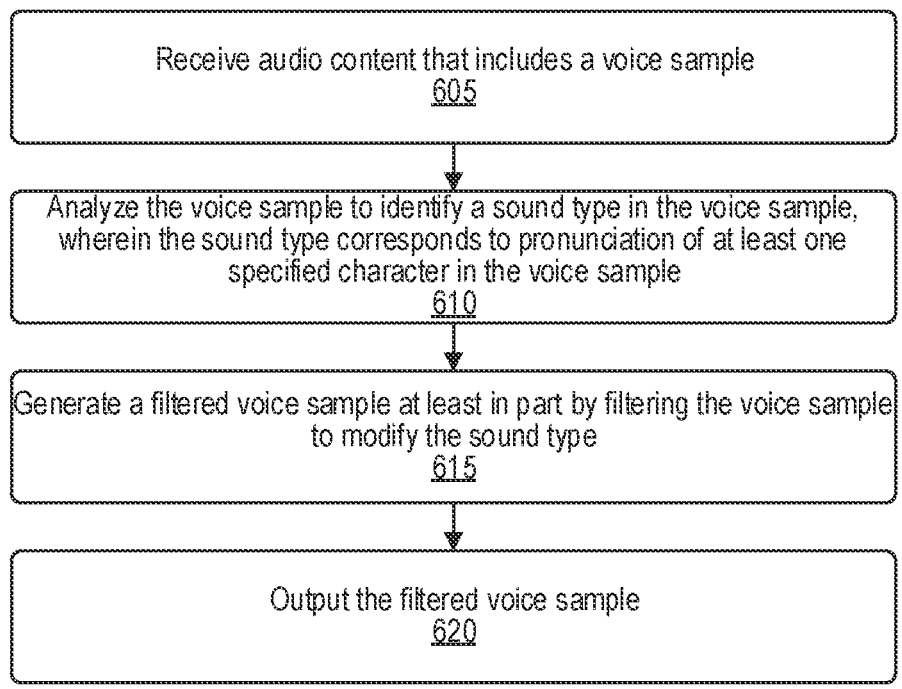
FIG. 6 is a flow diagram illustrating an audio processing process, in accordance with some examples.

FIG. 6 is a flow diagram illustrating an audio processing process 600. At least a subset of the audio processing process 600 can be performed by, and/or performed using, an audio processing system. The audio processing system may include, and/or use, for example, the network environment 100, the one or more interactive content servers 110, the one or more content provider server APIs 120, the content delivery network server 130, the audio processing server 140, the user devices 150, the network environment 200, the console 228, the one or more servers 218, the console 310, the recipient device(s) 375, the data store 380, the ML engine 520, the entertainment system 700, a system, an apparatus, a digital signal processor (DSP), a non-transitory computer readable storage medium having embodied thereon a program to be executed by a processor, or a combination thereof.

At operation 605, the audio processing system is configured to, and can, receive audio content that includes a voice sample. Examples of the audio content include the voice sample 330, the audio content 335, the voice sample 405, the voice sample 505, the media file 212, the activity file 216, the activity feed 224, the activity data file 251, the zone data file 252, the actor data file 254, the mechanic data file 256, the game media data file 258, or a combination thereof. Examples of the voice sample include the voice sample 330, the audio content 335, the voice sample 405, the voice sample 505, the media file 212, the activity file 216, the activity feed 224, the activity data file 251, the zone data file 252, the actor data file 254, the mechanic data file 256, the game media data file 258, or a combination thereof.

At operation 610, the audio processing system is configured to, and can, analyze the voice sample to identify a sound type in the voice sample. The sound type corresponds to pronunciation of at least one specified character in the voice sample.

In some examples, the sound type in the voice sample can include sound types corresponding to pronunciation of a specified character (e.g., letter or number or other character) in the voice sample, a specified sequence of characters (e.g., letters and/or numbers and/or or other characters) in the voice sample, a specified word in the voice sample, a specified sequence of words in the voice sample, or a combination thereof. In some examples, the sound type in the voice sample can include a sound type corresponding to sibilance. In some examples, the sound type in the voice sample can include sound types corresponding to certain frequencies, or frequency ranges. For instance, in some examples, the sound type in the voice sample can include a sound type corresponding to pronunciation of "s," "sh," "c," "ch," "f," or "t" sounds that produce sibilance in pronunciation of certain words. In some examples, In some examples, the sound type corresponds to pronunciation of the at least one specified character according to a voice type. In some examples, the voice type corresponds to at least one of a gender, a sex, an age, an ethnic background, an accent, a dialect (e.g., a regional dialect), a speech dysfluency (e.g., stuttering, stammering, repetition of sounds, sound prolongation, sound blocking, avoidance of sounds, breaks in fluency, hesitations), or a combination thereof.

In some examples, the sound type corresponds to pronunciation of the at least one specified character according to a voice frequency. In some examples, the sound type corresponds to pronunciation of the at least one specified character according to a relative position between a microphone (e.g., the microphone 325) and a person (e.g., the user 3050) during recording of the audio content (e.g., the audio content 335 and/or the voice sample 330) the using the microphone, where the voice sample is spoken by the person.

At operation 615, the audio processing system is configured to, and can, generate a filtered voice sample at least in part by filtering the voice sample to modify the sound type. Examples of the filtered voice sample include the filtered voice sample 370, the filtered voice sample 410, the filtered voice sample 530, the filtered voice sample 560, the media file 212, the activity file 216, the activity feed 224, the activity data file 251, the zone data file 252, the actor data file 254, the mechanic data file 256, the game media data file 258, or a combination thereof.

In some examples, filtering the voice sample includes applying a filter to the voice sample. Examples of the filter include the customized voice filter 345, the customized voice filter 355, the customized voice filter 365, the customized voice filter 450, the trained ML model(s) 525, a low pass filter, a passive low pass filter, an active low pass filter, a high pass filter, a passive high pass filter, an active high pass filter, a band pass filter, a passive band pass filter, an active band pass filter, a band stop filter, a passive band stop filter, an active band stop filter, a notch filter, a passive notch filter, an active notch filter, an all pass filter, a passive all pass filter, an active all pass filter, an equalization filter, a passive equalization filter, an active equalization filter, a de-esser, a compressor that filters a specified frequency range (e.g., where the audio content includes audio in the specified frequency range and where the specified frequency range corresponds to the sound type), sibilance reduction 415, normalization 420, noise reduction 425, frequency equalization 430, smoothing 435, compression, volume modification of portions of the audio, amplitude modification of portions of the audio, frequency modification of portions of the audio, other audio processing filters described herein, other audio processing operations described herein, or a combination thereof.

In some examples, the filter is customized to a voice type corresponding to the voice sample, as in the customized voice filter 345, the customized voice filter 355, the customized voice filter 365, the customized voice filter 450, and/or the trained ML model(s) 525. The voice type can correspond to one or more voices of one or more people. In some examples, the voice type can correspond to a voice of a single person, such as the voice of the user 305. In some examples, the voice type can correspond to a category of person that multiple people (e.g., including the user 305) can be categorized into, such as categories corresponding to a gender, a sex, an age, an ethnic background, an accent, a dialect (e.g., a regional dialect), a speech dysfluency (e.g., stuttering, stammering, repetition of sounds, sound prolongation, sound blocking, avoidance of sounds, breaks in fluency, hesitations), or a combination thereof. In some examples, the filter includes a trained machine learning model (e.g., ML model(s) 525) that is customized to the voice type. The trained machine learning model can have been trained using training data (e.g., the training data 570, the validation 575, the feedback 550, and/or any other additional training data for the further training 555) that includes one or more additional voice samples associated with the voice type. In some examples, the audio processing system is configured to, and can, train the trained machine learning model using the training data that includes the one or more additional voice samples associated with the voice type. In some examples, the audio processing system is configured to, and can, request at least one of the one or more additional voice samples (e.g., to be used as part of the training data) from a user device. The user device is associated with the voice type. In some examples, the audio processing system is configured to, and can, update the trained machine learning model using additional training data. The additional training data includes at least the voice sample (e.g., the voice sample 505) and the filtered voice sample (e.g., the filtered voice sample 530), for instance as discussed with respect to the validation 575, the feedback 550, and/or any other additional training data for the further training 555.

At operation 620, the audio processing system is configured to, and can, output the filtered voice sample. In some examples, outputting the filtered voice sample includes causing the filtered voice sample to be output using an audio output device, such as a set of one or more speakers or a set of one or more headphones. In some examples, outputting the filtered voice sample includes outputting the filtered voice sample using the audio output device. In some examples, the audio processing system includes the audio output device.

In some examples, outputting the filtered voice sample includes transmitting the filtered voice sample to a recipient device (e.g., recipient device(s) 375) over a communication interface. In some examples, the audio processing system includes the communication interface. In some examples, the audio processing system includes the recipient device.

Figure 7:
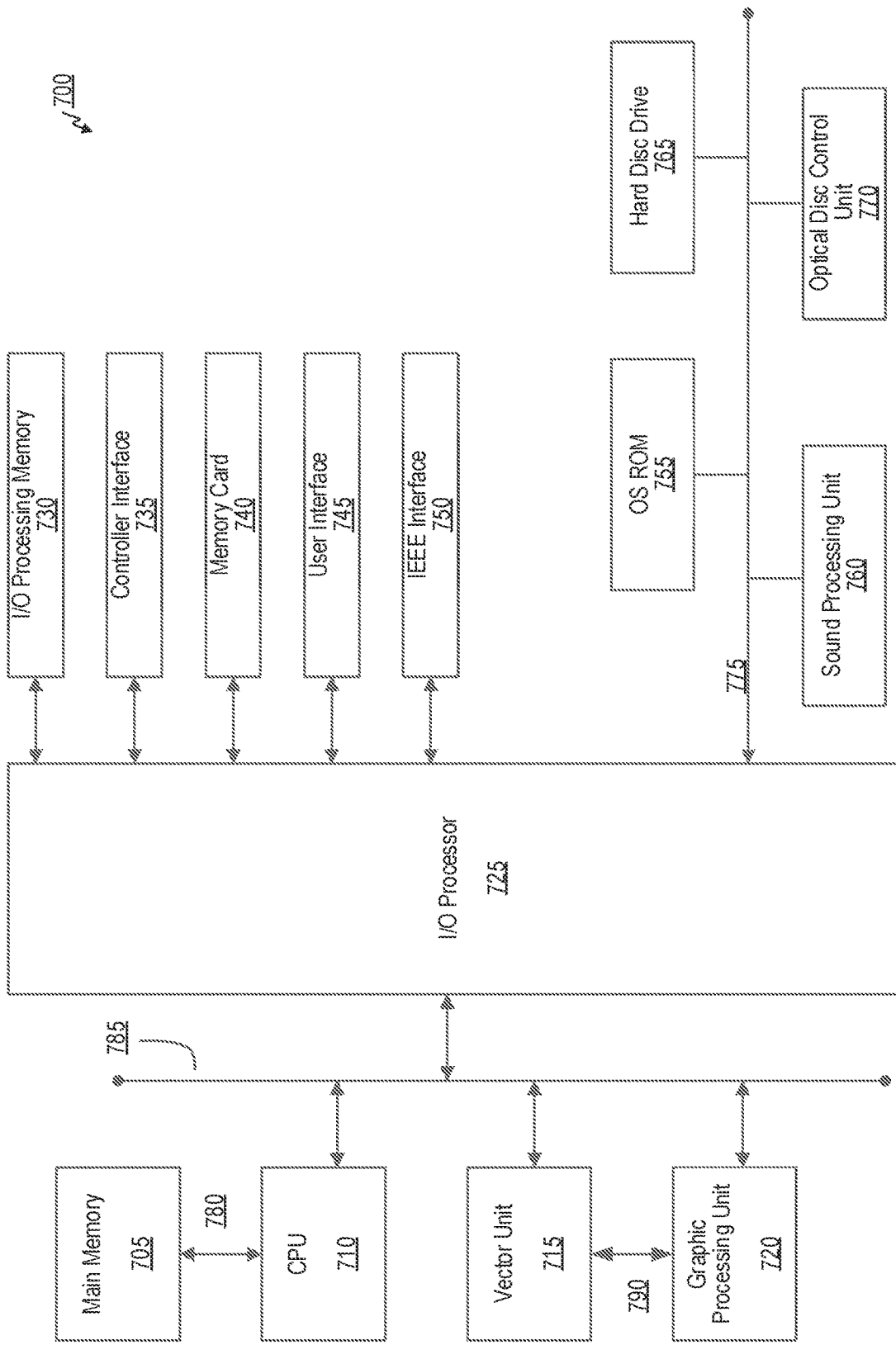
FIG. 7 is a block diagram of an exemplary electronic entertainment system that may be used in embodiments of the present invention.

FIG. 7 is a block diagram of an exemplary electronic entertainment system 700. The entertainment system 700 of FIG. 7 includes a main memory 705, a central processing unit (CPU) 710, vector unit 88, a graphics processing unit 720, an input/output (I/O) processor 725, an I/O processor memory 730, a controller interface 735, a memory card 740, a Universal Serial Bus (USB) interface 745, and an IEEE interface 750. The entertainment system 700 further includes an operating system read-only memory (OS ROM) 755, a sound processing unit 760, an optical disc control unit 770, and a hard disc drive 765, which are connected via a bus 775 to the I/O processor 725.

Entertainment system 700 may be an electronic game console. Alternatively, the entertainment system 700 may be implemented as a general-purpose computer, a set-top box, a hand-held game device, a tablet computing device, or a mobile computing device or phone. Entertainment systems may contain more or less operating components depending on a particular form factor, purpose, or design.

The CPU 710, the vector unit 88, the graphics processing unit 720, and the I/O processor 725 of FIG. 7 communicate via a system bus 785. Further, the CPU 710 of FIG. 7 communicates with the main memory 705 via a dedicated bus 780, while the vector unit 88 and the graphics processing unit 720 may communicate through a dedicated bus 790. The CPU 710 of FIG. 7 executes programs stored in the OS ROM 755 and the main memory 705. The main memory 705 of FIG. 7 may contain pre-stored programs and programs transferred through the I/O Processor 725 from a CD-ROM, DVD-ROM, or other optical disc (not shown) using the optical disc control unit 770. I/O Processor 725 of FIG. 7 may also allow for the introduction of content transferred over a wireless or other communications network (e.g., 5G, 4G, LTE, 3G, and so forth). The I/O processor 725 of FIG.

7 primarily controls data exchanges between the various devices of the entertainment system 700 including the CPU 710, the vector unit 88, the graphics processing unit 720, and the controller interface 735.

The graphics processing unit 720 of FIG. 7 executes graphics instructions received from the CPU 710 and the vector unit 88 to produce images for display on a display device (not shown). For example, the vector unit 88 of FIG. 7 may transform objects from three-dimensional coordinates to two-dimensional coordinates, and send the two-dimensional coordinates to the graphics processing unit 720. Furthermore, the sound processing unit 760 executes instructions to produce sound signals that are outputted to an audio device such as speakers (not shown). Other devices may be connected to the entertainment system 700 via the USB interface 745, and the IEEE 1394 interface 750 such as wireless transceivers, which may also be embedded in the system 700 or as a part of some other component such as a processor.

A user of the entertainment system 700 of FIG. 7 provides instructions via the controller interface 735 to the CPU 710. For example, the user may instruct the CPU 710 to store certain game information on the memory card 740 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. An apparatus for audio processing, the apparatus comprising:
   at least one memory storing instructions; and
   at least one processor that executes the instructions, wherein execution of the instructions by the at least one processor causes the at least one processor to:
      receive audio content that includes a voice sample of a voice of a user saying at least one word, the at least one word including a plurality of characters;
      analyze the voice sample to identify a sound type in the voice sample, wherein the sound type corresponds to a pronunciation by the user in the voice sample of at least one specified character of the plurality of characters;
      generate a filtered voice sample using a personalized filter at least in part by filtering the voice sample to modify the sound type, wherein the personalized filter is customized to the voice of the user based on at least one additional voice sample of the voice of the user; and
      output the filtered voice sample.

2. The apparatus of claim 1, wherein the sound type includes a sibilance.

3. The apparatus of claim 1, wherein the sound type corresponds to at least a voice type in the pronunciation by the user in the voice sample of the at least one specified character.

4. The apparatus of claim 3, wherein the voice type corresponds to at least one of a gender or a sex.

5. The apparatus of claim 3, wherein the voice type corresponds to at least one of an age, an accent, a dialect, or an ethnic background.

6. The apparatus of claim 1, wherein the sound type corresponds to at least a voice frequency in the pronunciation by the user in the voice sample of the at least one specified character.

7. The apparatus of claim 1, wherein the sound type corresponds to at least a relative position between a microphone and a person in the pronunciation by the user in the voice sample of the at least one specified character during recording of the audio content using the microphone, wherein the voice sample is spoken by the person.

8. The apparatus of claim 1, wherein the sound type corresponds to a speech dysfluency, wherein filtering the voice sample includes correcting the speech dysfluency.

9. The apparatus of claim 1, wherein filtering the voice sample includes applying a filter to the voice sample, wherein the filter includes a de-esser.

10. The apparatus of claim 1, wherein filtering the voice sample includes applying a filter to the voice sample, wherein the filter includes a compressor that filters a specified frequency range, wherein the audio content includes audio in the specified frequency range, wherein the specified frequency range corresponds to the sound type.

11. The apparatus of claim 1, wherein filtering the voice sample includes applying a filter to the voice sample, wherein the filter is customized to a voice type corresponding to the voice sample.

12. The apparatus of claim 11, wherein the filter includes a trained machine learning model that is customized to the voice type, the trained machine learning model having been trained using training data that includes one or more additional voice samples associated with the voice type.

13. The apparatus of claim 12, wherein the execution of the instructions by the at least one processor causes the at least one processor to:
request at least one of the one or more additional voice samples from a user device, wherein the user device is associated with the voice type.

14. The apparatus of claim 12, wherein the execution of the instructions by the at least one processor causes the at least one processor to:
update the trained machine learning model using additional training data, wherein the additional training data includes at least the voice sample and the filtered voice sample.

15. The apparatus of claim 1, wherein outputting the filtered voice sample includes causing the filtered voice sample to be output using an audio output device.

16. The apparatus of claim 1, wherein outputting the filtered voice sample includes transmitting the filtered voice sample to a recipient device over a communication interface.

17. The apparatus of claim 1, wherein the apparatus includes a digital signal processor (DSP).

18. A method of audio processing, the method comprising:
receiving audio content that includes a voice sample of a voice of a user saying at least one word, the at least one word including a plurality of characters;
analyzing the voice sample to identify a sound type in the voice sample, wherein the sound type corresponds to a pronunciation by the user in the voice sample of at least one specified character of the plurality of characters;
generating a filtered voice sample using a personalized filter at least in part by filtering the voice sample to modify the sound type, wherein the personalized filter is customized to the voice of the user based on at least one additional voice sample of the voice of the user; and
outputting the filtered voice sample.

19. The method of claim 18, wherein filtering the voice sample includes applying a filter to the voice sample, wherein the filter is customized to a voice type corresponding to the voice sample.

20. A non-transitory computer readable storage medium having embodied thereon a program, wherein the program is executable by a processor to perform a method of audio processing, the method comprising:
receiving audio content that includes a voice sample of a voice of a user saying at least one word, the at least one word including a plurality of characters;
analyzing the voice sample to identify a sound type in the voice sample, wherein the sound type corresponds to a pronunciation by the user in the voice sample of at least one specified character of the plurality of characters;
generating a filtered voice sample using a personalized filter at least in part by filtering the voice sample to modify the sound type, wherein the personalized filter is customized to the voice of the user based on at least one additional voice sample of the voice of the user; and
outputting the filtered voice sample.

* * * * *